(12) United States Patent
Seth

(10) Patent No.: US 9,642,109 B2
(45) Date of Patent: May 2, 2017

(54) SINGLE NETWORK REGISTRATION WHERE MULTIPLE APPLICATIONS ACCESS THE NETWORK USING SEPARATE PROCESSORS

(71) Applicant: QUALCOMM Incorporated, San Diego, CA (US)

(72) Inventor: Ritesh Seth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 13/972,777

(22) Filed: Aug. 21, 2013

(65) Prior Publication Data
US 2015/0056991 A1 Feb. 26, 2015

(51) Int. Cl.
H04W 4/00 (2009.01)
H04W 60/00 (2009.01)
H04L 29/06 (2006.01)

(52) U.S. Cl.
CPC ......... *H04W 60/00* (2013.01); *H04L 65/1073* (2013.01); *H04L 65/1006* (2013.01); *H04L 65/1016* (2013.01)

(58) Field of Classification Search
CPC . H04L 65/1073; H04L 65/1006; H04W 60/00
See application file for complete search history.

(56) References Cited

U.S. PATENT DOCUMENTS

| 8,306,531 | B2 | 11/2012 | Zhu et al. |
| 2004/0243680 | A1 | 12/2004 | Mayer |
| 2010/0046501 | A1 | 2/2010 | Witzel et al. |
| 2010/0293265 | A1 | 11/2010 | Lindholm et al. |
| 2011/0243126 | A1 | 10/2011 | Witzel et al. |
| 2013/0036400 | A1* | 2/2013 | Bak et al. ..................... 717/101 |
| 2013/0077620 | A1 | 3/2013 | Nakada et al. |
| 2013/0301529 | A1* | 11/2013 | Lindsay et al. ............... 370/328 |

FOREIGN PATENT DOCUMENTS

WO 2006125471 A1 11/2006

OTHER PUBLICATIONS

International Search Report and Written Opinion—PCT/US2014/051205—ISA/EPO—Dec. 16, 2014.

* cited by examiner

*Primary Examiner* — Charles Appiah
*Assistant Examiner* — Edward Zhang
(74) *Attorney, Agent, or Firm* — Muncy, Geissler, Olds & Lowe, P.C.

(57) ABSTRACT

The disclosure is directed to providing a single network registration for a first application on a first processor and a second application on a second processor of a user equipment (UE). An aspect initiates a network registration using a registration manager on the first processor, adds, from the second processor, first registration information for the second application to the registration manager on the first processor, and appends the network registration with the first registration information using the first processor.

44 Claims, 14 Drawing Sheets

SINGLE NETWORK REGISTRATION WHERE MULTIPLE APPLICATIONS ACCESS THE NETWORK USING SEPARATE PROCESSORS

BACKGROUND OF THE INVENTION

1. Field of the Invention

The disclosure is directed to providing a single network registration where multiple applications access the network using separate processors.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

The IP Multimedia Subsystem (IMS) framework currently provides various services, such as Voice over LTE (VoLTE), Video Telephony (VT), and Rich Communication Services (RCS). Ideally, all of these services should be co-located on a user device and show as one REGISTRATION on the network. If all of the services are communicating through either the modem processor or the application processor, then the REGISTRATION goes through one IP address (either the IP address of the modem processor or of the application processor) and shows as one REGISTRATION.

A problem arises, however, when RCS communicates through the application processor and VoLTE/VT applications communicate through the modem processor because, if RCS performs a REGISTRATION using the application processor's IP address and a VoLTE application performs a REGISTRATION using the modem processor's IP address, then there will be two registrations on the network from the same user device for different services.

SUMMARY

The disclosure is directed to providing a single network registration for a first application on a first processor and a second application on a second processor of a user equipment (UE). A method for providing a single network registration for a first application on a first processor and a second application on a second processor of a UE includes initiating a network registration using a registration manager on the first processor, adding, from the second processor, first registration information for the second application to the registration manager on the first processor, and appending the network registration with the first registration information using the first processor.

An apparatus for providing a single network registration for a first application on a first processor and a second application on a second processor of a UE includes logic configured to initiate a network registration using a registration manager on the first processor, logic configured to add, from the second processor, first registration information for the second application to the registration manager on the first processor, and logic configured to append the network registration with the first registration information using the first processor.

An apparatus for providing a single network registration for a first application on a first processor and a second application on a second processor of a UE includes means for initiating a network registration using a registration manager on the first processor, means for adding, from the second processor, first registration information for the second application to the registration manager on the first processor, and means for appending the network registration with the first registration information using the first processor.

A non-transitory computer-readable medium for providing a single network registration for a first application on a first processor and a second application on a second processor of a UE includes at least one instruction to initiate a network registration using a registration manager on the first processor, at least one instruction to add, from the second processor, first registration information for the second application to the registration manager on the first processor, and at least one instruction to append the network registration with the first registration information using the first processor.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
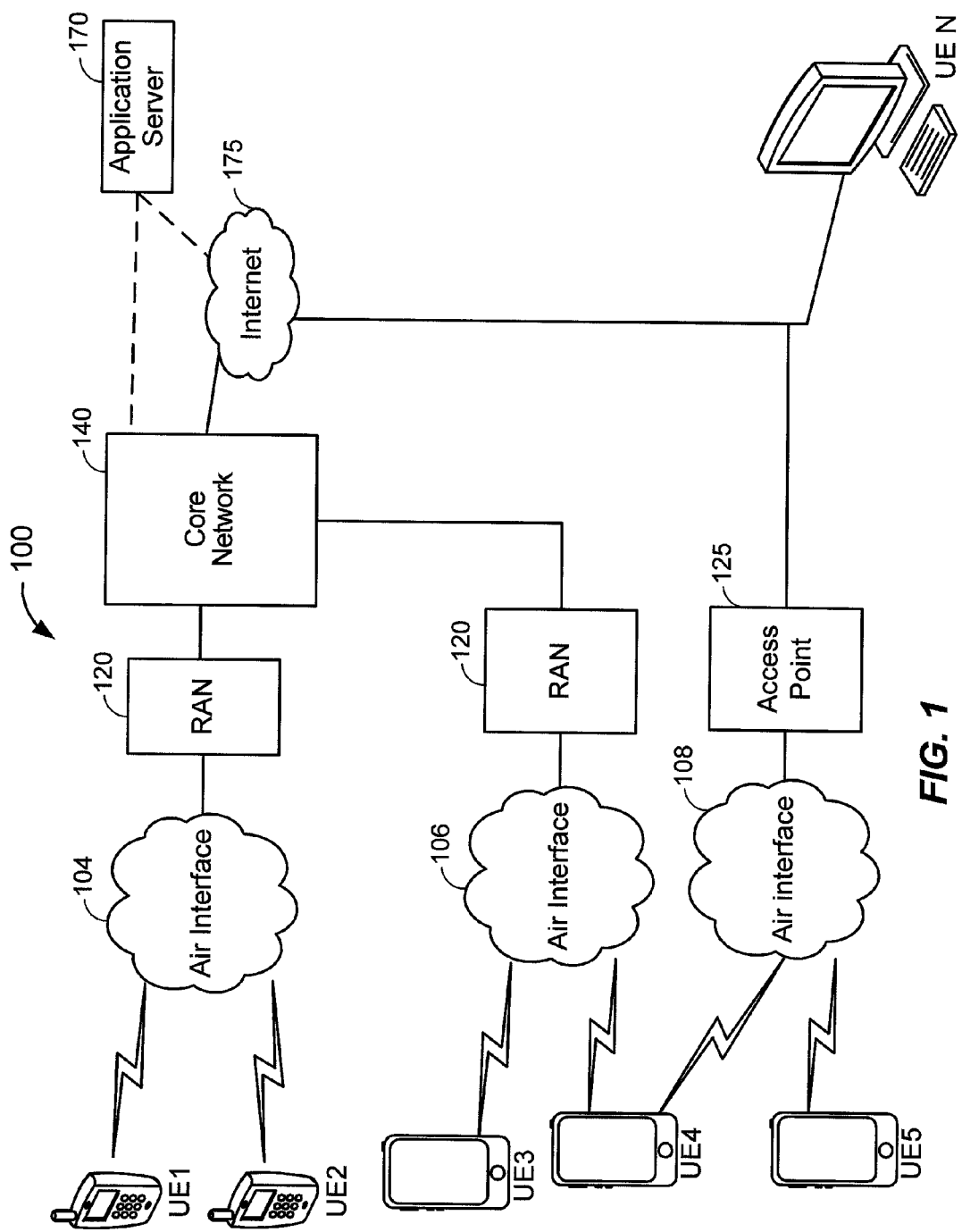
FIG. 1 illustrates a high-level system architecture of a wireless communications system in accordance with an aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System of Mobile Communication (GSM), Enhanced Data rates for GSM Evolution (EDGE), Wideband CDMA (W-CDMA), Long-Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Win or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example, UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
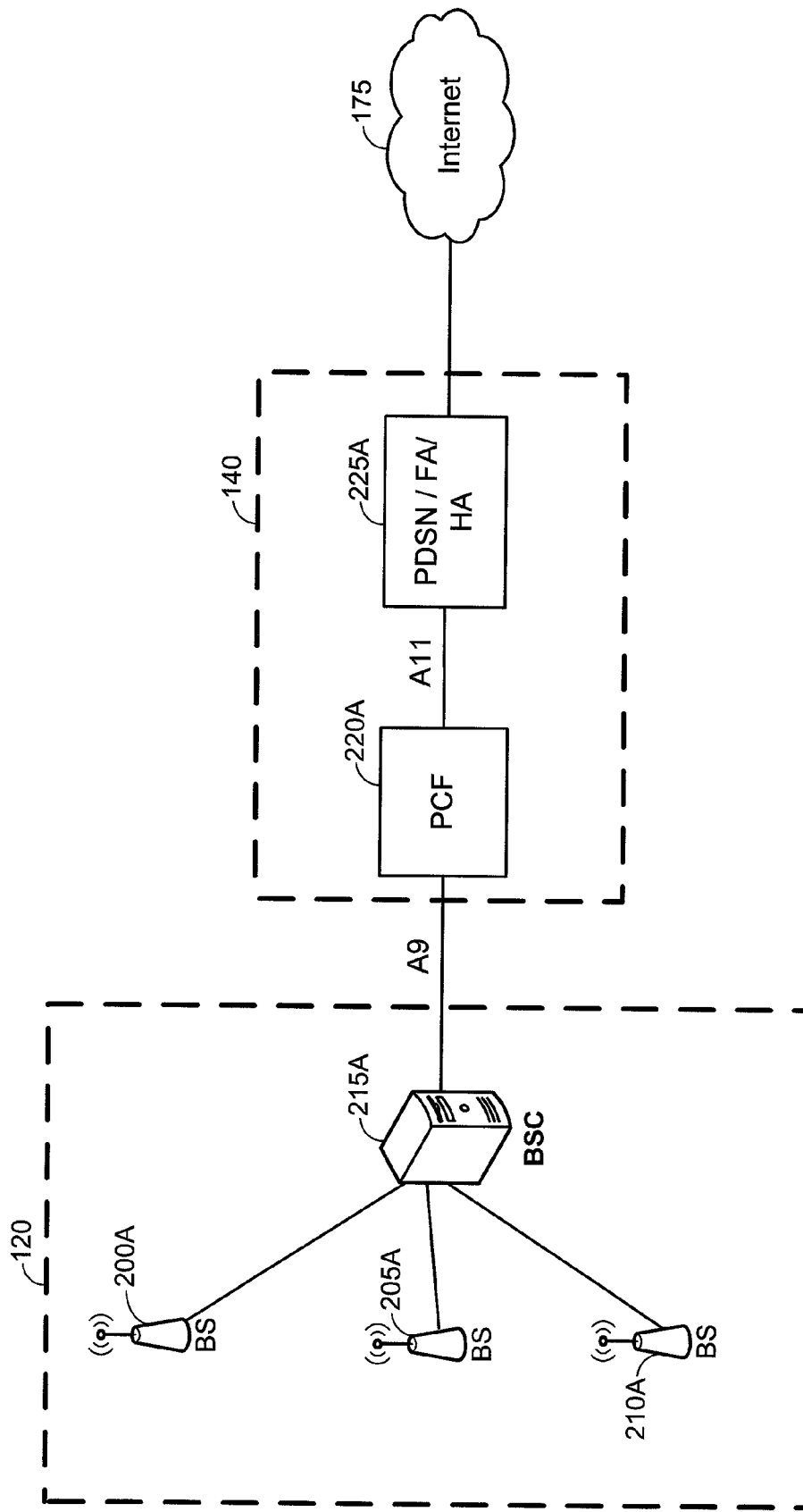
FIG. 2A illustrates an example configuration of a radio access network (RAN) and a packet-switched portion of a core network for a 1×EV-DO network in accordance with an aspect of the disclosure.

FIG. 2A illustrates an example configuration of the RAN 120 and the core network 140 for packet-switched communications in a CDMA2000 1x Evolution-Data Optimized (EV-DO) network in accordance with an aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
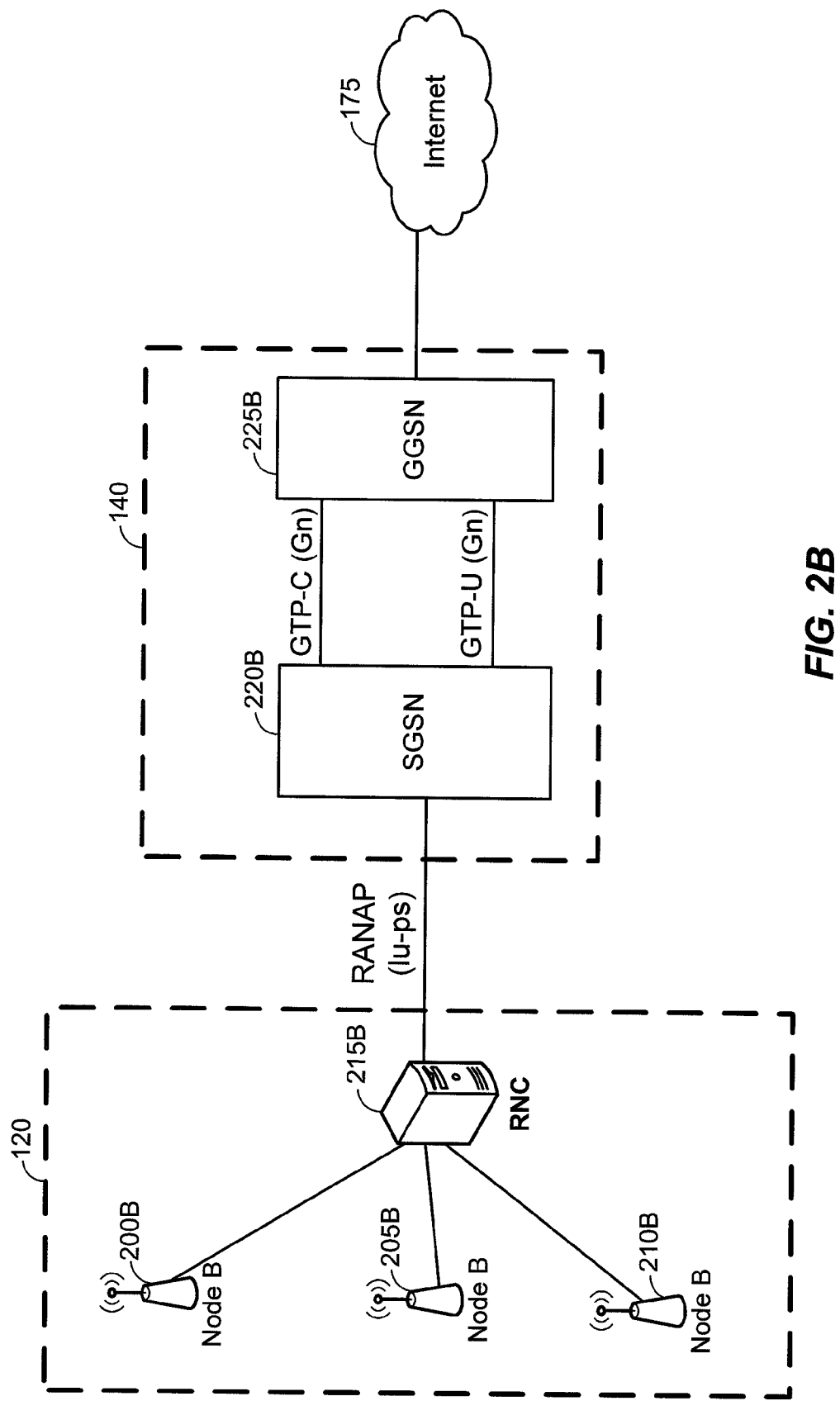
FIG. 2B illustrates an example configuration of the RAN and a packet-switched portion of a General Packet Radio Service (GPRS) core network within a 3G UMTS W-CDMA system in accordance with an aspect of the disclosure.

FIG. 2B illustrates an example configuration of the RAN 120 and a packet-switched portion of the core network 140 that is configured as a GPRS core network within a 3G UMTS W-CDMA system in accordance with an aspect of the disclosure. Referring to FIG. 2B, the RAN 120 includes a plurality of Node Bs 200B, 205B and 210B that are coupled to a Radio Network Controller (RNC) 215B over a wired backhaul interface. Similar to 1xEV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the example of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
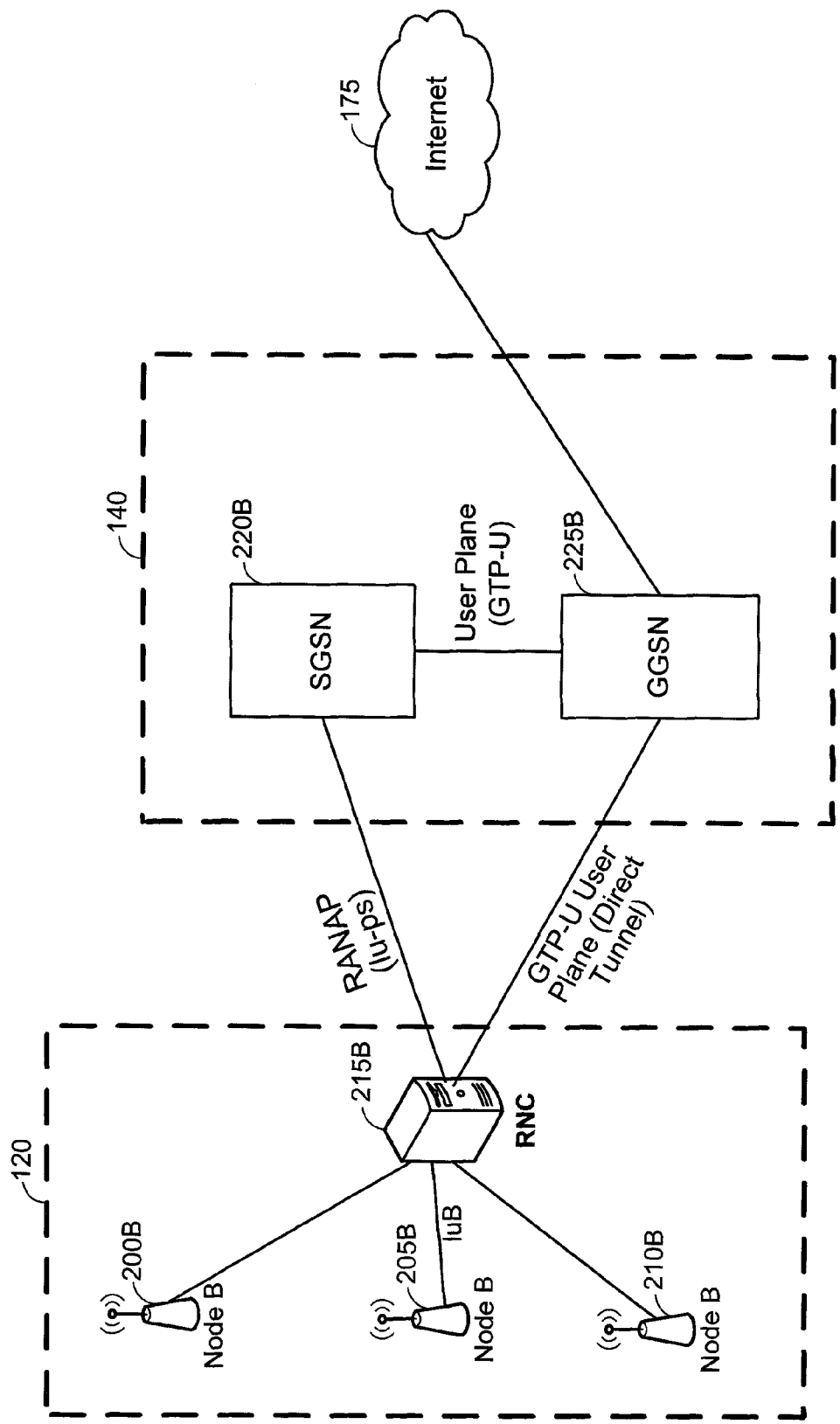
FIG. 2C illustrates another example configuration of the RAN and a packet-switched portion of a GPRS core network within a 3G UMTS W-CDMA system in accordance with an aspect of the disclosure.

FIG. 2C illustrates another example configuration of the RAN 120 and a packet-switched portion of the core network 140 that is configured as a GPRS core network within a 3G UMTS W-CDMA system in accordance with an aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
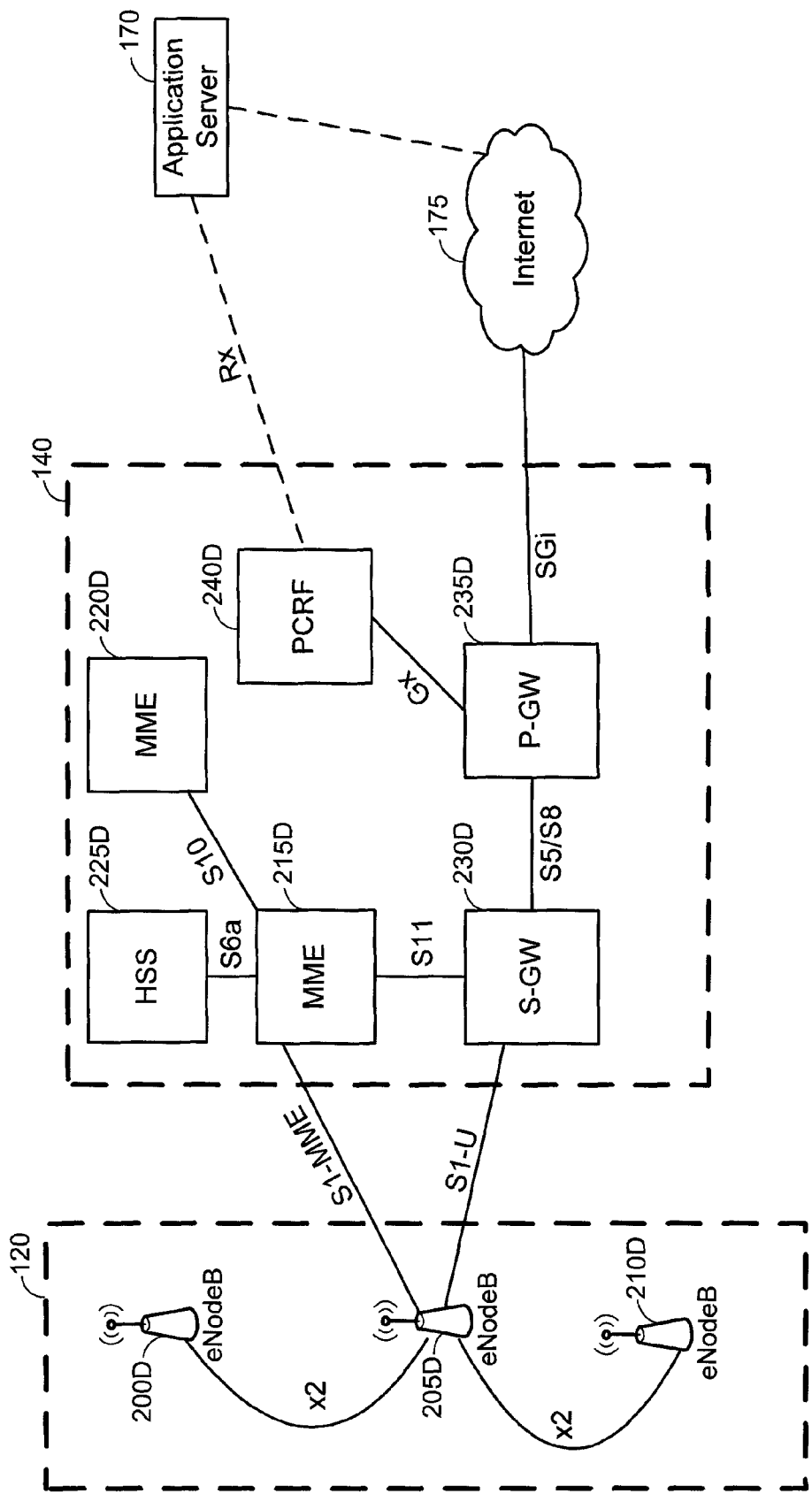
FIG. 2D illustrates an example configuration of the RAN and a packet-switched portion of the core network that is based on an Evolved Packet System (EPS) or Long Term Evolution (LTE) network in accordance with an aspect of the disclosure.

FIG. 2D illustrates an example configuration of the RAN 120 and a packet-switched portion of the core network 140 based on an Evolved Packet System (EPS) or LTE network, in accordance with an aspect of the disclosure. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
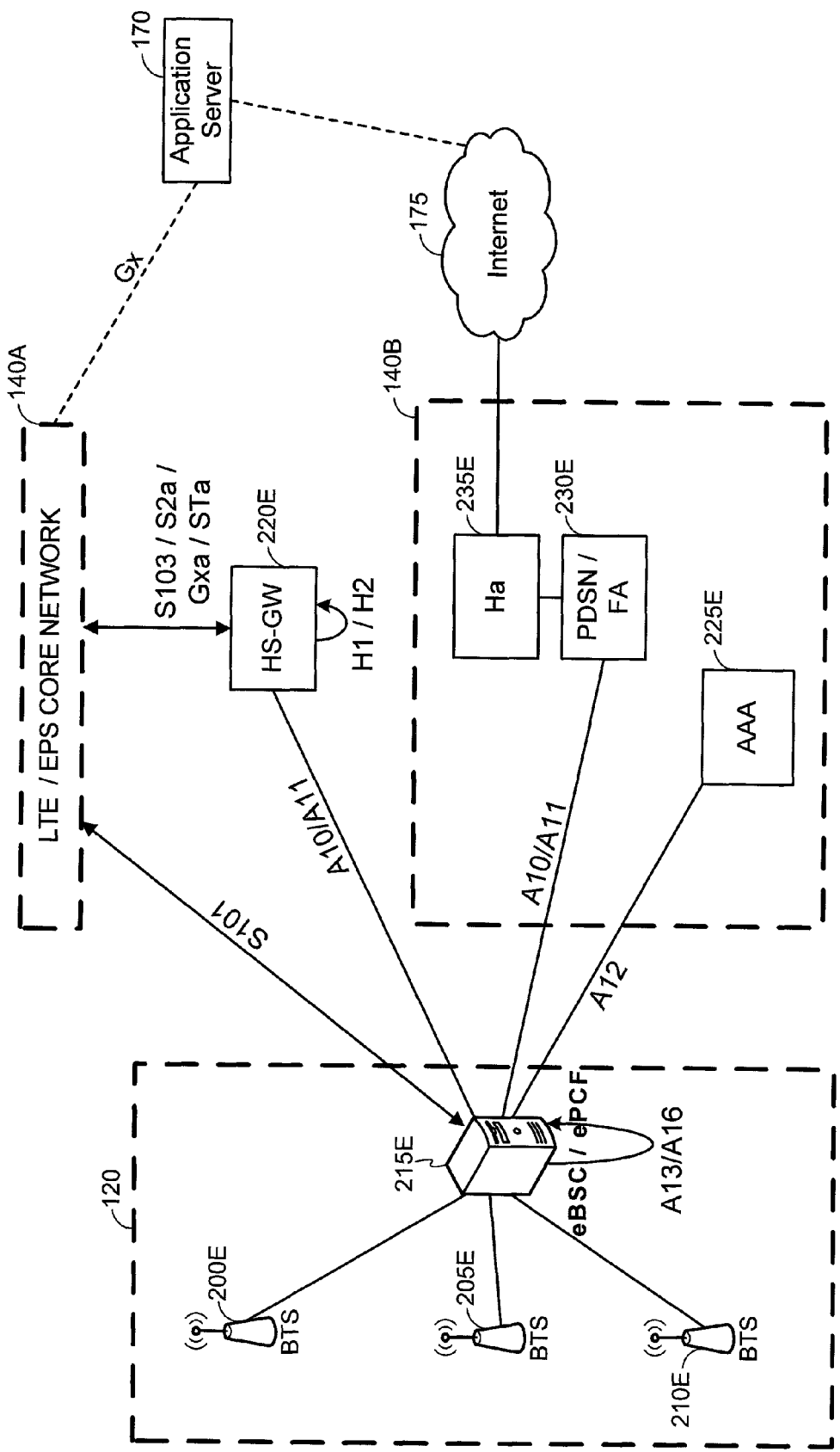
FIG. 2E illustrates an example configuration of an enhanced High Rate Packet Data (HRPD) RAN connected to an EPS or LTE network and also a packet-switched portion of an HRPD core network in accordance with an aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an aspect of the disclosure. The core network 140A is an EPS or LTE core network, similar to the core network described above with respect to FIG. 2D.

In FIG. 2E, the eHRPD RAN includes a plurality of base transceiver stations (BTS) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
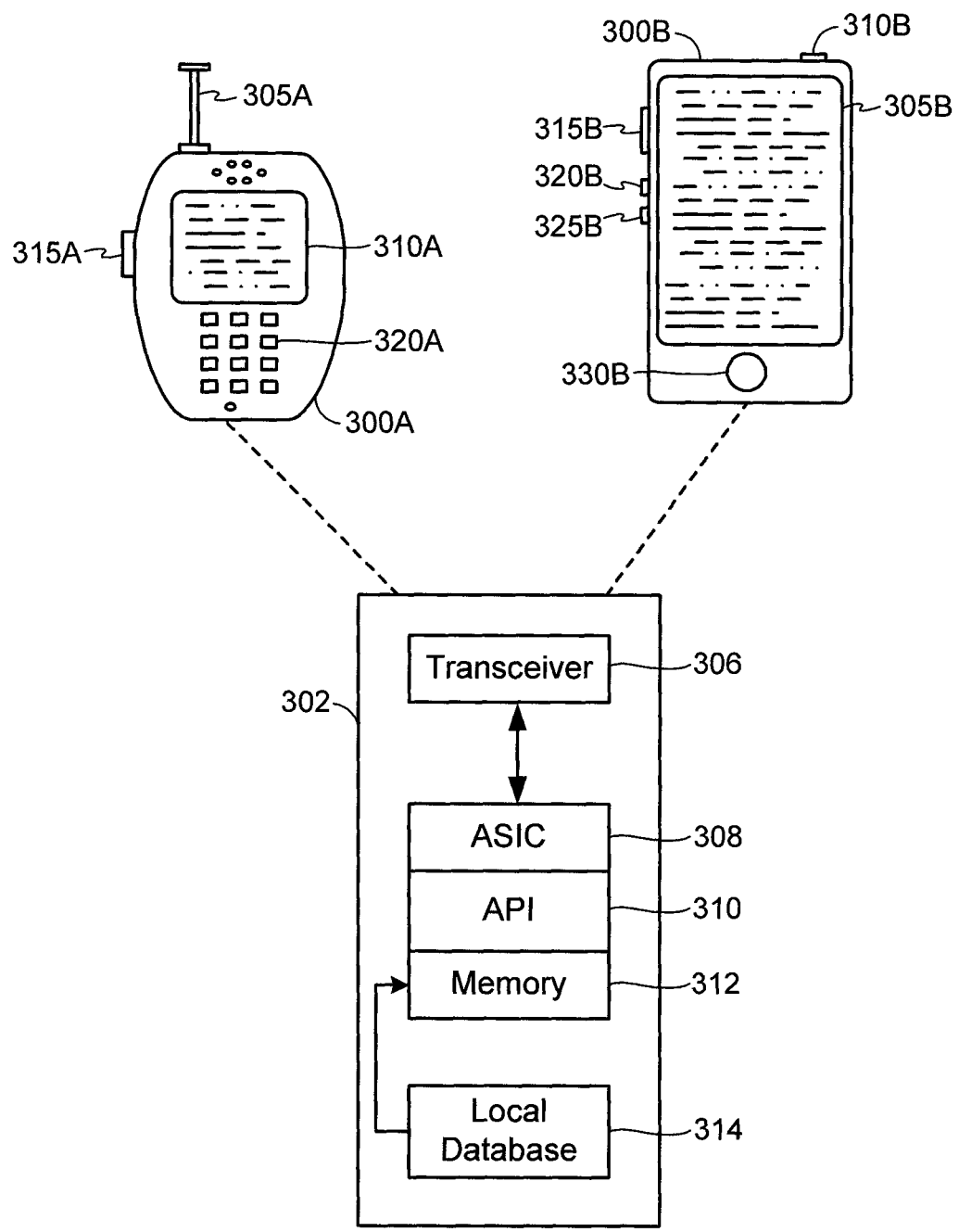
FIG. 3 illustrates examples of user equipments (UEs) in accordance with aspects of the disclosure.

FIG. 3 illustrates examples of UEs in accordance with aspects of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only memory (ROM) or random-access memory (RAM), electrically erasable programmable ROM (EEPROM), flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 4:
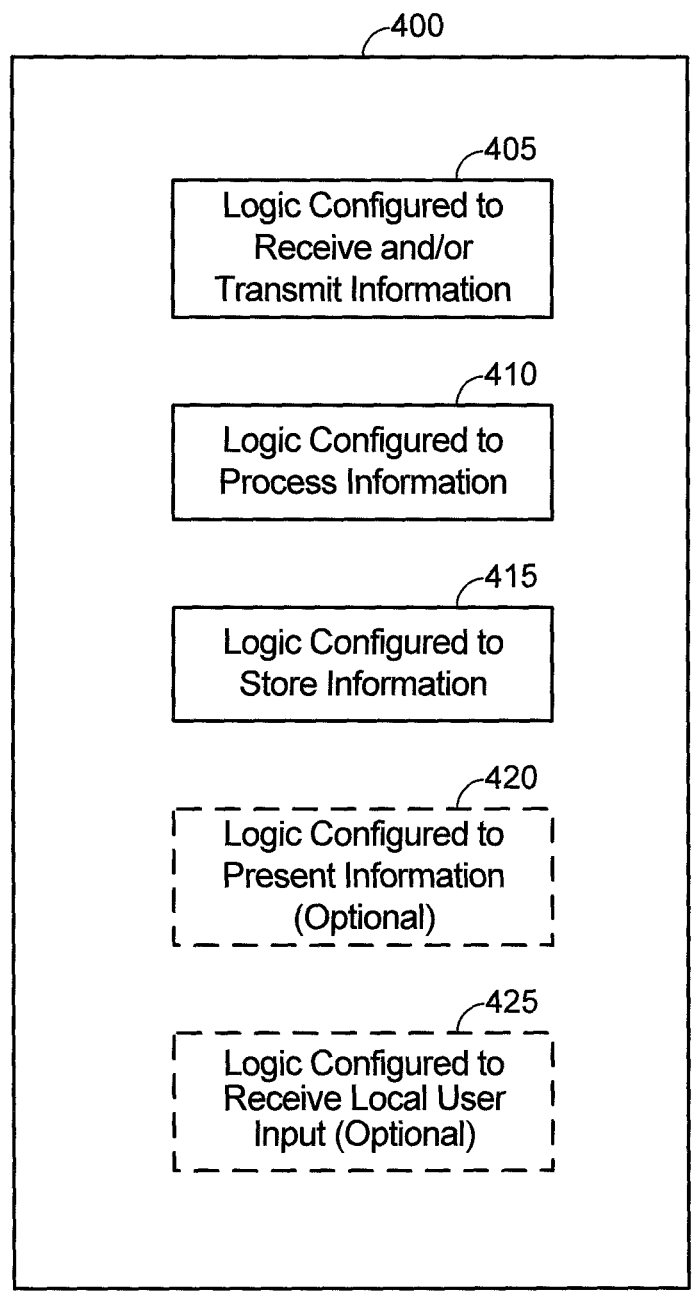
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Fir wire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the logic configured to process information 410 may include logic configured to initiate a network registration using a registration manager on a first processor, logic configured to add, from a second processor, first registration information for a second application to the registration manager on the first processor, and logic configured to append the network registration with the first registration information using the first processor. The processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory. ROM, erasable programmable ROM (EPROM), EEPROM, registers, hard disk, a removable disk, CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Sessions that operate over networks such as 1×EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or setup) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions.

Figure 5:
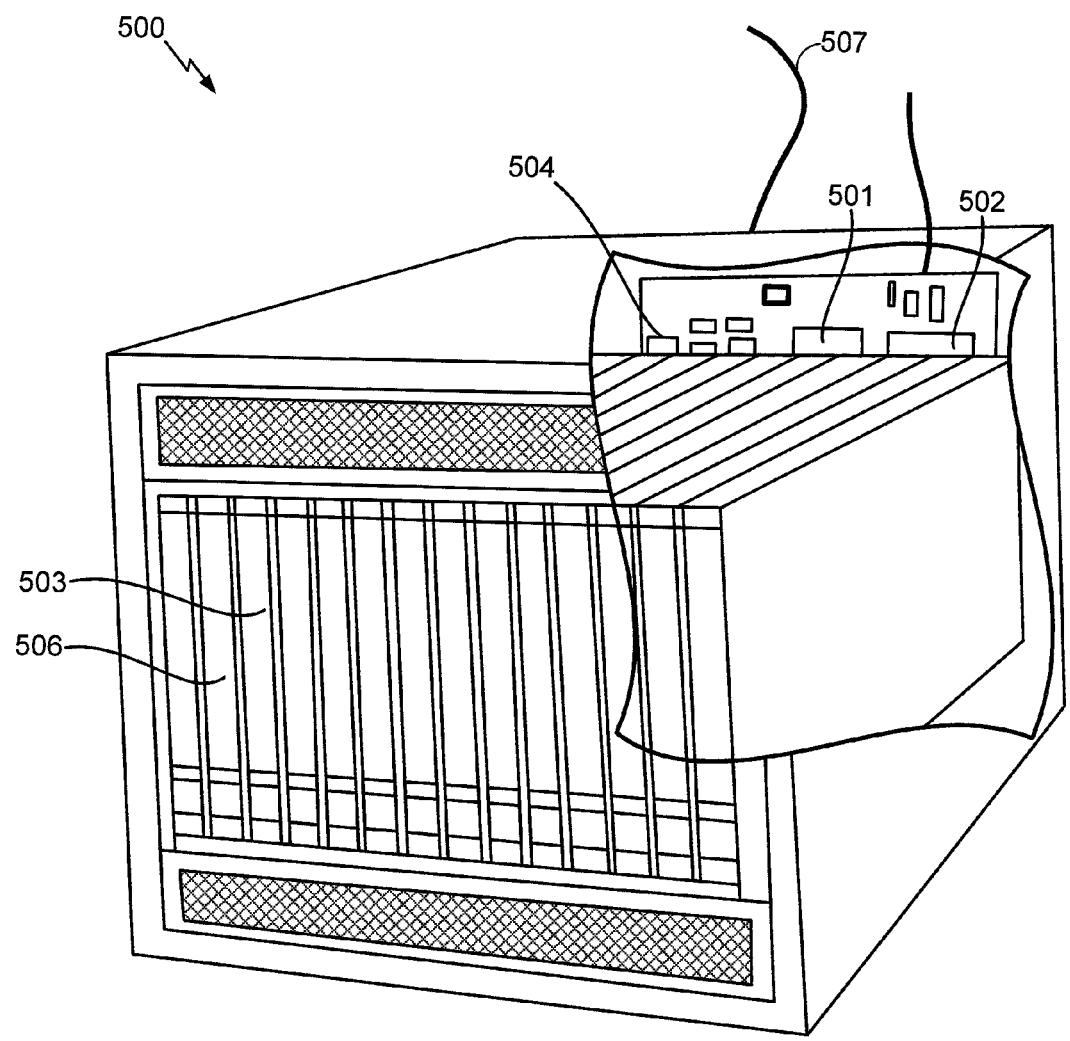
FIG. 5 illustrates an exemplary server according to various aspects of the disclosure.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access points 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

The IMS framework currently provides various services, such as VoLTE, Video Telephony (VT), and Rich Communication Services (RCS). Ideally, all of these services should be co-located on a user device and show as one registration on the network. If all of the services are communicating through either the modem processor or the application processor, then the registration goes through one IP address (either the IP address of the modem processor or of the application processor) and shows as one registration.

A problem arises, however, when the RCS communicates through the application processor and VoLTE/VT applications communicate through the modem processor because, if the RCS performs a registration using the application processor's IP address and a VoLTE application performs a registration using the modem processor's IP address, then there will be two registrations on the network from the same user device for different services.

Figure 6:
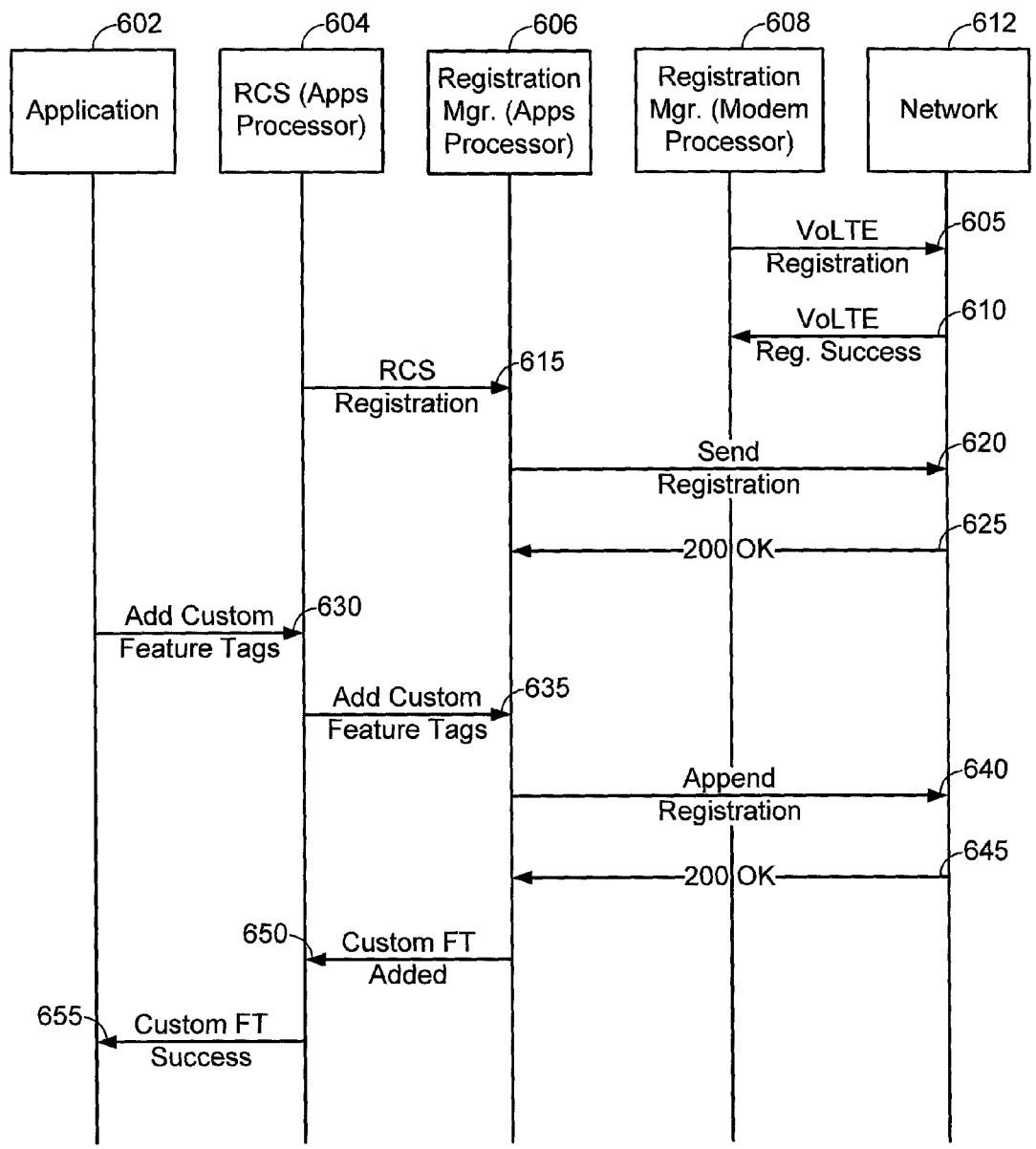
FIG. 6 illustrates an exemplary flow of a dual registration that may be performed by a UE.

FIG. 6 illustrates an exemplary flow of a dual registration. The registration may be performed at a UE, such as UE 300A or 300B. At 605, the registration manager 608 on the modem processor sends a VoLTE registration request, for example, to the network 612. The network 612 may include the various network elements illustrated in FIGS. 1-2E, such as the RAN 120, the core network 140, the application server 170, and the Internet 175. The UE may communicate with the network 612 as described above with respect to UEs 1 to N in FIG. 1 and/or UEs 300A and 300B in FIG. 3. At 610, the registration manager 608 receives a registration success message from the network 612. At this point, the VoLTE service is associated with the IP address of the modem processor.

At 615, the RCS 604 on the application processor sends an RCS registration request to the registration manager 606 on the application processor, or apps processor. At 620, the registration manager 606 sends a registration request for the RCS 604 to the network 612. At 625, the network 612 acknowledges the registration request with, for example, a 200 OK message. At this point, the RCS 604 is associated with the IP address of the application processor. Although FIG. 6 illustrates the VoLTE registration occurring before the RCS registration, the RCS registration may occur first, or the registrations may occur simultaneously.

At 630, an application 602 sends a request to the RCS 604 to register the application 602 with the network 612 by adding custom feature tags (FT) of the application 602 to the network registration. At 635, the RCS 604 sends a request to the registration manager 606 to add the custom feature tags to the network registration. At 640, the registration manager 606 sends a request to the network 612 to append the registration with the custom feature tags. At 645, the network 612 acknowledges the request with, for example, a 200 OK message. At 650, the registration manager 606 notifies the RCS 604 that the custom feature tags have been added to the network registration, and at 655, the RCS 604 notifies the application 602 that its custom feature tags have been successfully added to the network registration.

To provide a single registration when RCS, for example, is running on the application processor and IMS/VoLTE applications, for example, are running on the modem processor, the IMS stack can be split between the modem processor and the application processor, leaving the network dispatcher on the modem processor. In this way, a session initiation protocol (SIP) message is always dispatched to and received from the network via the modem processor, but registration can be initiated by the modem processor, the application processor, or both. Thus, when the modem processor boots up, it can perform the IMS registration and then, when the application processor completes its initial configuration, it can trigger the re-registration to the modem processor by adding RCS-specific feature tags through a proprietary pipe between the modem processor and the application processor.

Figure 7:
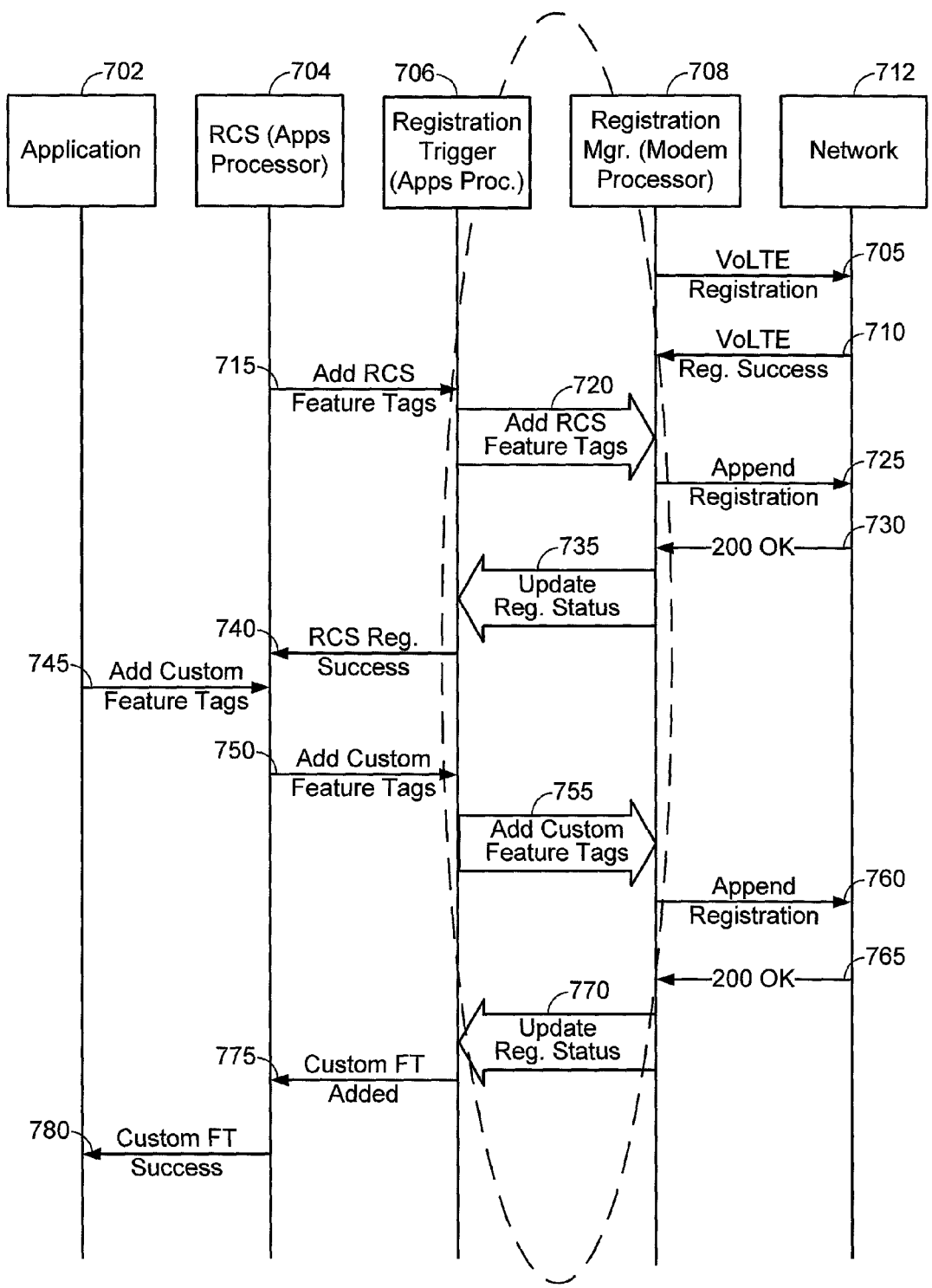
FIG. 7 illustrates an exemplary flow of a single network registration that may be performed by a UE.

FIG. 7 illustrates an exemplary flow of a single network registration. The registration may be performed at a UE, such as UE 300A or 300B. At 705, the registration manager 708 on the modem processor sends a VoLTE registration request, for example, to the network 712. The network 712 may include the various network elements illustrated in FIGS. 1-2E, such as the RAN 120, the core network 140, the application server 170, and the Internet 175. The UE may communicate with the network 712 as described above with respect to UEs 1 to N in FIG. 1 and/or UEs 300A and 300B in FIG. 3. At 710, the registration manager 708 receives a registration success message from the network 712. At this point, the VoLTE service is associated with the IP address of the modem processor.

At 715, the RCS 704 on the application processor, or apps processor, sends a request to a registration trigger 706 on the application processor to register the RCS 704 with the network 712. The registration request may include default RCS feature tags. An application or service, such as the RCS 704, may register with the network 712 by adding its feature tags (FT) to the current network registration, or by creating a network registration that includes its feature tags if there is no current network registration. At 720, the registration trigger 706 sends a registration request to the registration manager 708 on the modem processor to register the RCS 704 with the network 712 by adding the RCS feature tags to the network registration. A registration request may simply be the feature tags of the application or service, such as the RCS 704, requesting network registration. At 725, the registration manager 708 sends a request to the network 712 to append the current network registration with the RCS feature tags.

At 730, the network 712 acknowledges the request with, for example, a 200 OK message. At 735, the registration manager 708 on the modem processor sends a message to the registration trigger 706 on the application processor indicating that the network registration status has been updated with the default RCS feature tags. At 740, the registration trigger 706 notifies the RCS 704 that the registration was successful. At this point, the RCS 704 is associated with the IP address of the modem processor, rather than the application processor. Although FIG. 7 illustrates the VoLTE registration occurring before the RCS registration, the RCS registration may occur first, or the registrations may occur simultaneously.

At 745, an application 702 sends a request to the RCS 704 to register the application 702 with the network 712. The application 702 may be, but need not be, associated with the RCS 704, for example, an RCS application. Rather, the RCS 704 simply facilitates the API's of the application 702 being added to the registration manager 708, and in the form of RCS capability. As with the RCS 704, the application 702 may register with the network 712 by adding its custom feature tags to the current network registration. The custom feature tags may be, but need not be, custom RCS feature tags. At 750, the RCS 704 sends a request to the registration trigger 706 to add the application's 702 custom feature tags to the current network registration. At 755, the registration trigger 706 sends a request to the registration manager 708 on the modem processor to add the application's 702 custom feature tags to the network registration, thereby registering the application 702 with the network 712. At 760, the registration manager 708 sends a request to the network 712 to append the network registration with the custom feature tags.

At 765, the network 712 acknowledges the request with, for example, a 200 OK message. At 770, the registration manager 708 on the modem processor sends a message to the registration trigger 706 on the application processor indicating that the registration status has been updated with the application's 702 custom feature tags. At 775, the registration trigger 706 notifies the RCS 704 that the custom feature tags have been added to the network registration, and at 780, the RCS 704 notifies the application 702 that its custom feature tags have been successfully added to the network registration. At this point, the application 702 is associated with the IP address of the modem processor, rather than the application processor.

As illustrated in FIG. 7, the registration trigger 706 receives registration requests from applications and/or services that would otherwise register with the network 712 through the application processor, such as application 702 and the RCS 704, and forwards them to the registration manager 708 on the modem processor instead of sending them out to the network 712. By forwarding these registration requests to the registration manager 708 on the modem processor, these applications/services will be associated with the IP address of the modem processor, rather than the IP address of the application processor. In that way, all applications/services running on the UE will have the same IP address.

Although FIG. 7 illustrates a VoLTE service registering with the network 712 via the registration manager 708 on the modem processor, the VoLTE service is just an example, and the illustrated registration is equally applicable to any service or application that registers with the network 712 via the modem processor. Likewise, although FIG. 7 illustrates the RCS 704 registering with the network 712 via the registration trigger 706 on the application processor, the RCS 704 is just an example, and the illustrated registration is equally applicable to any service or application that registers with the network 712 via the application processor.

While FIG. 7 illustrates a single application 702, in addition to the RCS 704, registering with the network 712, any number of applications may register with the network 712 via the registration trigger 706 on the application processor. Where multiple applications and/or services register through the registration trigger 706, the registration trigger 706 may combine the custom feature tags of each application received within a threshold period of time into a single registration request, send separate registration requests with each application's custom feature tags, or a combination of both. For example, the registration trigger 706 may combine the custom feature tags of each application that launches when the UE boots up into a single registration request, and then send individual registration requests for applications that the UE launches after boot up.

Figure 8:
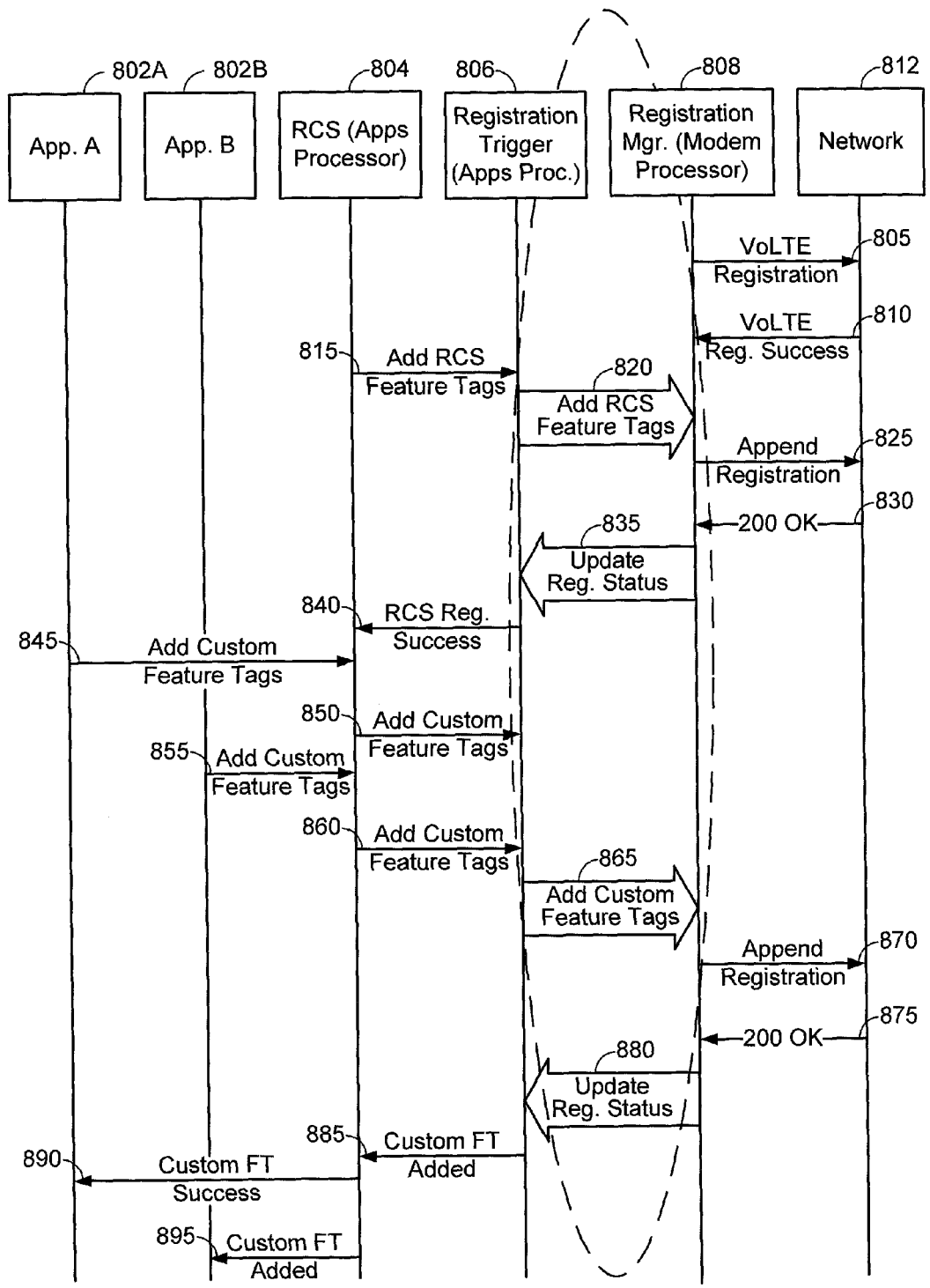
FIG. 8 illustrates an exemplary flow of a single network registration with multiple applications that may be performed by a UE.

FIG. 8 illustrates an exemplary flow of a single network registration with multiple applications. The flow illustrated in FIG. 8 is similar to the flow illustrated in FIG. 7, except that there are multiple applications 802A and 802B instead of the single application 702. As in FIG. 7, the registration may be performed at a UE, such as UE 300A or 300B.

At 805, the registration manager 808 on the modem processor sends a VoLTE registration request, for example, to the network 812. As in FIG. 7, the network 812 may include the various network elements illustrated in FIGS. 1-2E, such as the RAN 120, the core network 140, the application server 170, and the Internet 175. The UE may communicate with the network 812 as described above with respect to UEs 1 to N in FIG. 1 and/or UEs 300A and 300B in FIG. 3. At 810, the registration manager 808 receives a registration success message from the network 812. At this point, the VoLTE service is associated with the IP address of the modem processor.

At 815, the RCS 804 on the application processor, or apps processor, sends a request to the registration trigger 806 on the application processor to register the RCS 804 with the network 812. As described above, an application or service, such as the RCS 804, may register with the network 812 by adding its feature tags (FT) to the current network registration, or by creating a network registration that includes its feature tags if there is no current network registration. The feature tags may be default RCS feature tags. At 820, the registration trigger 806 sends a registration request to the registration manager 808 on the modem processor to register the RCS 804 with the network 812 by adding the RCS feature tags to the network registration. A registration request may simply be the feature tags of the application or service, such as the RCS 804, requesting network registration. At 825, the registration manager 808 sends a request to the network 812 to append the current network registration with the RCS feature tags.

At 830, the network 812 acknowledges the request with, for example, a 200 OK message. At 835, the registration manager 808 on the modem processor sends a message to the registration trigger 806 on the application processor indicating that the network registration status has been updated with the default RCS feature tags. At 840, the registration trigger 806 notifies the RCS 804 that the registration was successful. At this point, the RCS 804 is associated with the IP address of the modem processor, rather than the IP address of the application processor. Although FIG. 8 illustrates the VoLTE registration occurring before the RCS registration, the RCS registration may occur first, or the registrations may occur simultaneously.

At 845, an application A 802A sends a request to the RCS 804 to register the application A 802A with the network 812. The application A 802A may be, but need not be, an application associated with the RCS 804. As with the RCS 804 adding its default feature tags to the network registration, the application A 802A may register with the network 812 by adding its custom feature tags to the current network registration. The custom feature tags may be, but need not be, custom RCS feature tags. At 850, the RCS 804 sends a request to the registration trigger 806 to add the application A's 802A custom feature tags to the current network registration.

At 855, an application B 802B sends a request to the RCS 804 to register the application B 802B with the network 812. The application B 802B may be, but need not be, an application associated with the RCS 804. As with the application A 802A, the application B 802B may register with the network 812 by adding its custom feature tags to the current network registration. At 860, the RCS 804 sends a request to the registration trigger 806 to add the application B's 802B custom feature tags to the current network registration.

At 865, the registration trigger 806 sends a request to the registration manager 808 on the modem processor to add the custom feature tags of applications A 802A and B 802B to the network registration, thereby registering the applications A 802A and B 802B with the network 812. The registration trigger 806 may combine the custom feature tags of each application into a single registration request, as illustrated in FIG. 8, or send them as separate registration requests (not shown). At 870, the registration manager 808 sends a request to the network 812 to append the network registration with the custom feature tags. The registration manager 808 may send a single registration request if the registration trigger 806 combined the custom feature tags, as illustrated in FIG. 8, or separate registration requests if the registration trigger 806 did not combine the custom feature tags (not shown).

At 875, the network 812 acknowledges the request with, for example, a 200 OK message. At 880, the registration manager 808 on the modem processor sends a message to the registration trigger 806 on the application processor indicating that the registration status has been updated with the custom feature tags of applications A 802A and B 802B. At 885, the registration trigger 806 notifies the RCS 804 that the custom feature tags were added to the network registration. If the registration requests were separate registration requests, then there would be separate acknowledgments for each registration request (not shown).

At 890, the RCS 804 notifies the application A 802A that its custom feature tags were successfully added to the network registration. At 895, the RCS 804 notifies the application B 802B that its custom feature tags were successfully added to the network registration. At this point, the applications A 802A and B 802B are associated with the IP address of the modem processor, rather than the application processor.

As illustrated in FIG. 8, the registration trigger 806 receives registration requests from multiple applications and/or services that would otherwise register with the network 812 through the application processor, such as applications A 802A and B 802B and the RCS 804, and forwards them to the registration manager 808 on the modem processor instead of sending them out to the network 812. By forwarding these registration requests to the registration manager 808 on the modem processor, these applications/services will be associated with the IP address of the modem processor, rather than the IP address of the application processor. In that way, all applications/services running on the UE will have the same IP address.

Although FIG. 8 illustrates a VoLTE service registering with the network 812 via the registration manager 808 on the modem processor, the VoLTE service is just an example, and the illustrated registration is equally applicable to any service or application that registers with the network 812 via the modem processor. Likewise, although FIG. 8 illustrates the RCS 804 registering with the network 812 via the registration trigger 806 on the application processor, the RCS 804 is just an example, and the illustrated registration is equally applicable to any service or application that registers with the network 812 via the application processor.

Figure 9:
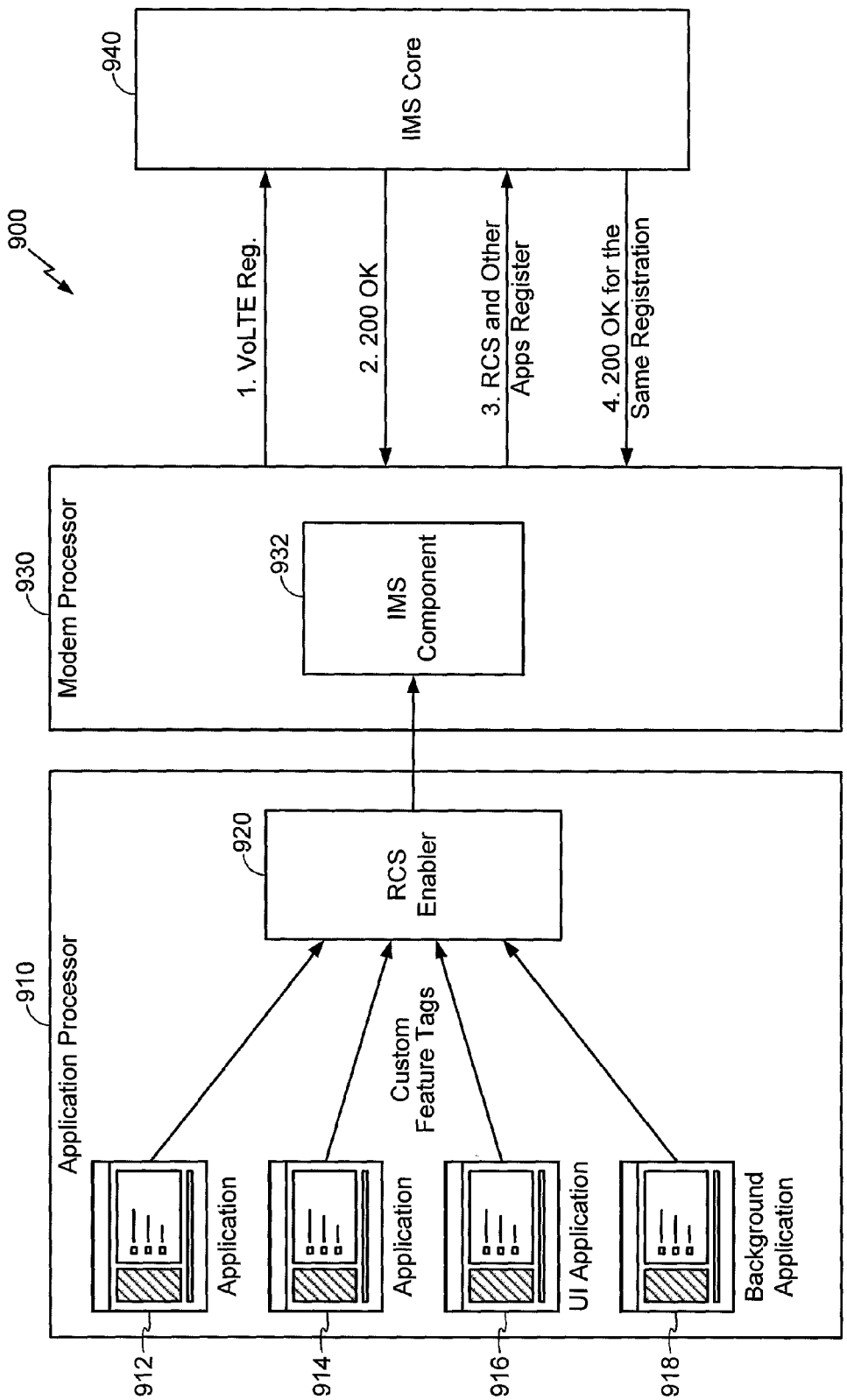
FIG. 9 illustrates an exemplary architecture for implementing a single registration on a UE.

FIG. 9 illustrates an exemplary architecture 900 for implementing a single registration. The architecture 900 may be embodied on a UE, such as UE 300A or 300B. As illustrated in FIG. 9, four applications 912, 914, 916, and 918 wish to register with the IMS core 940. In the example of FIG. 9, the application 918 is a background application, the application 916 is a user interface (UI) application, and the applications 912 and 914 are other applications on the application processor. Each application 912-918 sends its custom feature tags to an RCS enabler 920 to request registration with the IMS core 940, regardless of whether they are RCS applications or not. These custom feature tags are added through the RCS because eventually these feature tags can also be added as part of the RCS capability discovery, thus providing third party application stickiness. Additionally, this prevents feature tags from being added that overlap the functionality that is already offered by the RCS.

The RCS enabler 920 may combine the custom feature tags into a single registration request and transmit the registration request to the IMS component 932 on the modem processor 930, as illustrated in FIG. 9. Alternatively, the RCS enabler 920 may send a separate registration request for each received set of custom feature tags (not shown). The IMS component 932 may be an IMS stack that both the application processor 910 and the modem processor 930 share. The registration request(s) received from the RCS enabler 920 may be pushed onto this stack.

Referring to the modem processor 930, at step 1, the modem processor 930 performs the VoLTE registration and, at step 2, receives an acknowledgment from the IMS core 940, such as a 200 OK message. At step 3, the modem processor 930 sends a registration request to the IMS core 940 that includes the registration requests for the applications 912-918, that is, the combined custom feature tags of the applications 912-918 received by the IMS component

932. The registration request may also include a registration request from the RCS. Although not shown, if the registration requests from the applications 912-918 are sent to the IMS component 932 as separate registration requests, the modem processor 930 can forward each set of custom feature tags to the IMS core 940 as a separate registration request. At step 4, the modem processor 930 receives an acknowledgment from the IMS core 940 indicating that the current registration has been updated with the custom feature tags of the applications 912-918 and the RCS. The acknowledgement may be a 200 OK message.

Although FIG. 9 illustrates a VoLTE service registering with the IMS core 940 via the modem processor 930, the VoLTE service is just an example, and the illustrated registration is equally applicable to any service or application that registers with the IMS core 940 via the modem processor 930. Likewise, although FIG. 9 illustrates the RCS registering with the IMS core 940 via the application processor 910, the RCS is just an example, and the illustrated registration is equally applicable to any service or application that registers with the IMS core 940 via the application processor 910, such as the applications 912-918.

Figure 10:
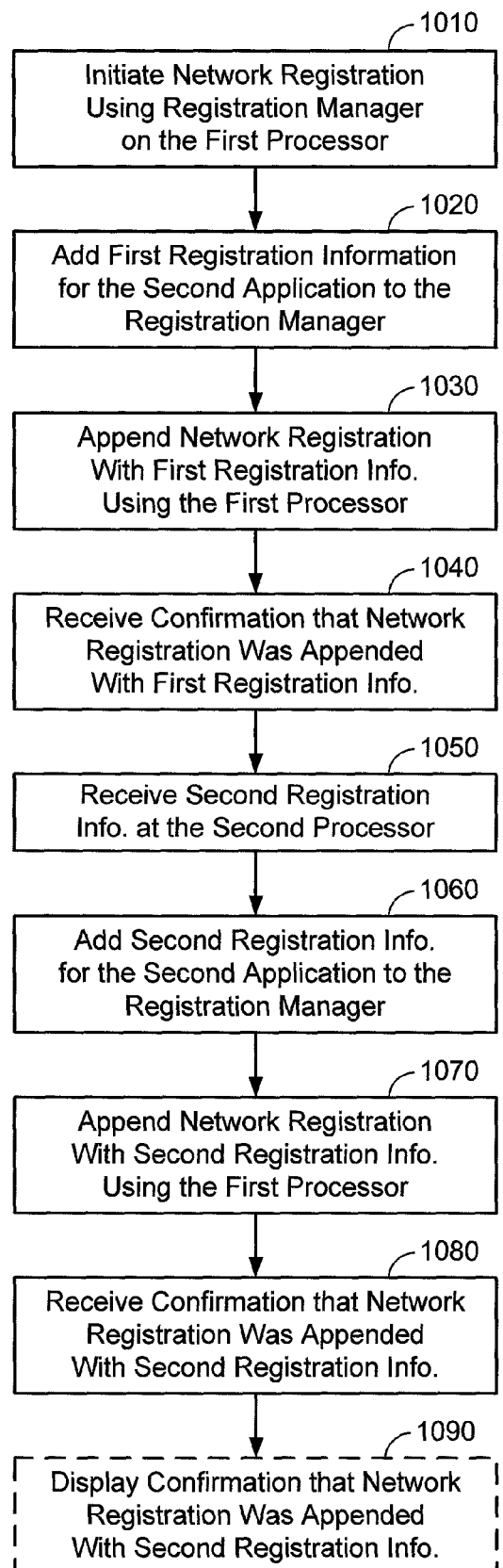
FIG. 10 illustrates an exemplary flow for providing a single network registration for a first application on a first processor and a second application on a second processor of a UE.

FIG. 10 illustrates an exemplary flow for providing a single network registration for a first application on a first processor and a second application on a second processor of a UE. The first processor may be a modem processor, such as modem processor 930 in FIG. 9, and the second processor may be an application processor, such as application processor 910 in FIG. 9. The first application may be a VoLTE application. The second application may or may not be an RCS application.

At 1010, the UE initiates a network registration using a registration manager on the first processor. The UE, via the first processor, may perform the initiating during a boot-up procedure. The network registration may include one or more registrations from one or more applications. For example, the network registration may include one of a VoLTE registration, an RCS registration, a video telephony registration, a short message service (SMS) registration, or an application registration. The UE/first processor may perform the initiating as illustrated in 705 and 710 of FIG. 7 and/or 805 and 810 of FIG. 8.

At 1020, the UE adds, from the second processor, first registration information for the second application to the registration manager on the first processor. The UE, via the Second processor, may add the first registration information upon completion of an initial configuration of the UE. The first registration information may be predefined registration information, such as a set of predefined, or default, RCS feature tags. The UE/second processor may add the first registration information as illustrated in 715 and 720 of FIG. 7 and/or 815 and 820 of FIG. 8.

At 1030, the UE appends the network registration with the first registration information using the first processor. The UE may append the network registration as illustrated in 725 and 730 of FIG. 7 and/or 825 and 830 of FIG. 8.

At 1040, the UE receives, at the second processor, a confirmation that the network registration was appended with the first registration information. The UE/second processor may receive the confirmation as illustrated in 735 and 740 of FIG. 7 and/or 835 and 840 of FIG. 8.

At 1050, the UE receives, at the second processor, the second registration information from, for example, a user interface of the UE. The UE/second processor may receive the second registration information as illustrated in 745 and 750 of FIG. 7 and/or 845, 850, 855, and 860 of FIG. 8.

At 1060, the UE adds, from the second processor, second registration information for the second application to the registration manager on the first processor. The second registration information may be custom registration information, such as a set of custom feature tags associated with an application. For example, the second registration information may be a set of custom RCS feature tags. The UE/second processor may add the second registration information as illustrated in 755 of FIG. 7 and/or 865 of FIG. 8.

The first processor and the second processor may share a common stack, such as an IMS stack. This IMS stack may be part of the IMS component 932 in FIG. 9. The second processor may add the second registration information for the second application to the common stack. The common stack may reside on, and/or be controlled by, the registration manager on the first processor.

At 1070, the UE appends the network registration with the second registration information using the first processor. The UE/first processor may append the network registration as illustrated in 760 and 765 of FIG. 7 and/or 870 and 875 of FIG. 8.

At 1080, the UE receives, at the second processor, a confirmation that the network registration was appended with the second registration information. The UE/second processor may receive the confirmation as illustrated in 770 and 775 of FIG. 7 and/or 880 and 885 of FIG. 8.

At 1090, the UE may optionally display, on the user interface, a confirmation that the network registration was appended with the second registration information.

While the aspects above have been described primarily with reference to 1×EV-DO architecture in CDMA2000 networks, GPRS architecture in W-CDMA or UMTS networks and/or EPS architecture in LTE-based networks, it will be appreciated that other aspects can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for providing a single network registration for a first application on a first processor and a second application on a second processor of a user equipment (UE), comprising:
    initiating a network registration using a registration manager on the first processor;
    writing, by the second processor, first registration information for the second application to the registration manager on the first processor, wherein the registration manager comprises a common stack shared by the first processor and the second processor;
    reading, by the first processor, the first registration information for the second application from the registration manager; and
    appending the network registration with the first registration information using the first processor.

2. The method of claim 1, further comprising:
    writing, by the second processor, second registration information for the second application to the registration manager on the first processor; and
    appending the network registration with the second registration information using the first processor.

3. The method of claim 2, further comprising:
    receiving, at the second processor, the second registration information from a user interface of the UE.

4. The method of claim 3, further comprising:
    receiving, at the second processor, a confirmation that the network registration was appended with the second registration information.

5. The method of claim 3, further comprising:
    displaying, on the user interface, a confirmation that the network registration was appended with the second registration information.

6. The method of claim 2, wherein the first registration information comprises predefined registration information and the second registration information comprises custom registration information.

7. The method of claim 6, wherein the predefined registration information comprises a set of predefined Rich Communication Services (RCS) feature tags and the custom registration information comprises a set of custom feature tags associated with an application.

8. The method of claim 7, wherein the application comprises a non-RCS application.

9. The method of claim 7, wherein the application comprises an RCS application.

10. The method of claim 2, wherein the second registration information comprises a set of custom RCS feature tags.

11. The method of claim 1, further comprising:
    receiving, at the second processor, a confirmation that the network registration was appended with the first registration information.

12. The method of claim 1, wherein the first processor comprises a modem processor.

13. The method of claim 1, wherein the first application comprises a voice over long term evolution (VoLTE) application.

14. The method of claim 1, wherein the second processor comprises an application processor.

15. The method of claim 1, wherein the second application comprises an RCS application.

16. The method of claim 1, wherein the first registration information comprises a set of default RCS feature tags.

17. The method of claim 1, wherein the common stack is an Internet protocol (IP) multimedia subsystem (IMS) stack.

18. The method of claim 1, wherein the network registration comprises one or more registrations from one or more applications.

19. The method of claim 1, wherein the network registration comprises one of a VoLTE registration, an RCS registration, a video telephony registration, a short message service (SMS) registration, or an application registration.

20. The method of claim 1, wherein the first processor performs the initiating during a boot-up procedure of the UE.

21. The method of claim 1, wherein the second processor performs the adding the first registration information upon completion of an initial configuration of the UE.

22. An apparatus for providing a single network registration for a first application on a first processor and a second application on a second processor of a user equipment (UE), comprising:
the first processor, wherein the first processor is configured to initiate a network registration using a registration manager on the first processor; and
the second processor, wherein the second processor is configured to write first registration information for the second application to the registration manager on the first processor;
wherein the first processor is further configured to read the first registration information for the second application from the registration manager, and to append the network registration with the first registration information.

23. The apparatus of claim 22, wherein the second processor is configured to write second registration information for the second application to the registration manager on the first processor; and
wherein the first processor is further configured to append the network registration with the second registration information.

24. The apparatus of claim 23, wherein the second processor is configured to receive the second registration information from a user interface of the UE.

25. The apparatus of claim 24, wherein the second processor is configured to receive a confirmation that the network registration was appended with the second registration information.

26. The apparatus of claim 24, wherein the user interface is further configured to display a confirmation that the network registration was appended with the second registration information.

27. The apparatus of claim 23, wherein the first registration information comprises predefined registration information and the second registration information comprises custom registration information.

28. The apparatus of claim 27, wherein the predefined registration information comprises a set of predefined Rich Communication Services (RCS) feature tags and the custom registration information comprises a set of custom feature tags associated with an application.

29. The apparatus of claim 28, wherein the application comprises a non-RCS application.

30. The apparatus of claim 28, wherein the application comprises an RCS application.

31. The apparatus of claim 23, wherein the second registration information comprises a set of custom RCS feature tags.

32. The apparatus of claim 22, wherein the second processor is configured to receive a confirmation that the network registration was appended with the first registration information.

33. The apparatus of claim 22, wherein the first processor comprises a modem processor.

34. The apparatus of claim 22, wherein the first application comprises a voice over long term evolution (VoLTE) application.

35. The apparatus of claim 22, wherein the second processor comprises an application processor.

36. The apparatus of claim 22, wherein the second application comprises an RCS application.

37. The apparatus of claim 22, wherein the first registration information comprises a set of default RCS feature tags.

38. The apparatus of claim 22, wherein the common stack is an Internet protocol (IP) multimedia subsystem (IMS) stack.

39. The apparatus of claim 22, wherein the network registration comprises one or more registrations from one or more applications.

40. The apparatus of claim 22, wherein the network registration comprises one of a VoLTE registration, an RCS registration, a video telephony registration, a short message service (SMS) registration, or an application registration.

41. The apparatus of claim 22, wherein the first processor initiates the network registration during a boot-up procedure of the UE.

42. The apparatus of claim 22, wherein the second processor adds the first registration information upon completion of an initial configuration of the UE.

43. An apparatus for providing a single network registration for a first application on a first processing means and a second application on a second processing means of a user equipment (UE), comprising:
the first processing means, the first processing means for initiating a network registration using a registration manager on the first processing means; and
the second processing means, the second processing means for writing first registration information for the second application to the registration manager on the first processing means, wherein the registration manager comprises a common stack shared by the first processing means and the second processing means;
wherein the first processing means is further for reading the first registration information for the second application from the registration manager, and for appending the network registration with the first registration information.

44. A non-transitory computer-readable medium for providing a single network registration for a first application on a first processor and a second application on a second processor of a user equipment (UE), comprising:
at least one instruction to initiate a network registration using a registration manager on the first processor;
at least one instruction to write, by the second processor, first registration information for the second application to the registration manager on the first processor, wherein the registration manager comprises a common stack shared by the first processor and the second processor;
at least one instruction to read, by the first processor, the first registration information for the second application from the registration manager; and
at least one instruction to append the network registration with the first registration information using the first processor.

* * * * *